US008621371B2

(12) United States Patent
Suzuki et al.

(10) Patent No.: US 8,621,371 B2
(45) Date of Patent: Dec. 31, 2013

(54) DEVICE, PROGRAM, METHOD AND SYSTEM FOR DATA TRANSMISSION

(75) Inventors: Nobuhiko Suzuki, Aichi (JP); Wataru Tomida, Aichi (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 759 days.

(21) Appl. No.: 11/528,522

(22) Filed: Sep. 28, 2006

(65) Prior Publication Data
US 2007/0070410 A1 Mar. 29, 2007

(30) Foreign Application Priority Data

Sep. 28, 2005 (JP) ................................. 2005-282834

(51) Int. Cl.
G06F 3/00 (2006.01)
(52) U.S. Cl.
USPC ............................ 715/761; 715/760; 715/765
(58) Field of Classification Search
USPC ......... 715/739, 705, 708, 711, 713, 714, 808, 715/809, 810, 814, 818, 819, 820, 761, 200, 715/205, 218, 219, 234, 236, 238, 252, 700, 715/760, 762, 765, 766, 798, 800, 825; 709/200
See application file for complete search history.

(56) References Cited

U.S. PATENT DOCUMENTS

| 6,094,186 | A * | 7/2000 | Kuroda et al. | 715/246 |
| 6,157,363 | A * | 12/2000 | Haine | 345/629 |
| 6,209,005 | B1 * | 3/2001 | Harker et al. | 715/236 |
| 6,489,978 | B1 * | 12/2002 | Gong et al. | 715/845 |
| 6,509,912 | B1 * | 1/2003 | Moran et al. | 715/762 |
| 7,379,704 | B2 * | 5/2008 | Parker et al. | 434/350 |
| 7,788,590 | B2 * | 8/2010 | Taboada et al. | 715/761 |

(Continued)

FOREIGN PATENT DOCUMENTS

| JP | 11-191837 | 7/1999 |
| JP | 2000-115340 | 4/2000 |

(Continued)

OTHER PUBLICATIONS

European Search Report and European Search Opinion Issued in Corresponding European Patent Application No. 06254969.6, dated on May 29, 2007.

(Continued)

Primary Examiner — Enrique Iturralde
(74) Attorney, Agent, or Firm — Miles & Stockbridge P.C.

(57) ABSTRACT

A data transmission device comprises: an entry information acquisition unit which acquires entry information from a storage device; an entry information display unit which displays the acquired entry information on a display device in a style discriminating between entry information including detailed information and entry information not including the detailed information; an entry information selection unit which selects a piece of entry information including the detailed information from the entry information displayed on the display device depending on an input through an input device; a detailed information display unit which displays the detailed information included in the selected entry information on the display device; a destination information acquisition unit which acquires destination information from the selected entry information; and a data transmission unit which executes data transmission using the acquired destination information.

14 Claims, 11 Drawing Sheets

(56) References Cited

U.S. PATENT DOCUMENTS

| | | | |
|---|---|---|---|
| 2003/0084050 A1 | 5/2003 | Hall et al. | |
| 2003/0160808 A1* | 8/2003 | Foote et al. | 345/700 |
| 2004/0078752 A1* | 4/2004 | Johnson, Jr. | 715/501.1 |
| 2004/0130578 A1* | 7/2004 | Charney | 345/810 |
| 2005/0091272 A1* | 4/2005 | Smith et al. | 707/104.1 |
| 2005/0102368 A1 | 5/2005 | Forman et al. | |
| 2005/0141042 A1* | 6/2005 | Kawasaki et al. | 358/402 |
| 2005/0166154 A1* | 7/2005 | Wilson et al. | 715/751 |
| 2005/1016588 | 7/2005 | Moody et al. | |
| 2005/0203918 A1 | 9/2005 | Holbrook | |
| 2005/1021029 | 9/2005 | Ohtani | |
| 2006/0161864 A1* | 7/2006 | Windl | 715/810 |
| 2007/0073652 A1* | 3/2007 | Taboada et al. | 707/3 |

FOREIGN PATENT DOCUMENTS

| | | |
|---|---|---|
| JP | 2004-274486 A | 9/2004 |
| JP | 2005-210547 | 8/2005 |
| JP | 2005-217632 | 8/2005 |
| JP | 2005-260326 | 9/2005 |

OTHER PUBLICATIONS

"Hierarchical Drop-Down List Boxes", pp. 283-284, IBM Technical Disclosure Bulletin, IBM Corp. New York, USA.

Japanese Office Action, with English Translation, issued in Japanese Patent Application No. 2005-282834, dated on Jan. 28, 2008.

Chinese Rejection Decision, w/ English translation thereof, issued in Chinese Patent Application No. CN 200610159976.9 dated Oct. 11, 2010.

Chinese Office Action issued in Chinese Patent Application No. 2006 10159976.9 dated May 25, 2012.

Notification of Reexamination mailed Nov. 23, 2012 issued in corresponding CN Patent Application No. 200610159976.9.

European Search Report issued in European Patent Application No. 06 254 969.6 dated May 8, 2012.

European Office Action issued in European Patent Application No. 06254969.6 mailed on Oct. 26, 2012.

Summons to attend oral proceedings pursuant to Rule 115(1) EPC issued in the corresponding European patent application No. 06254969.6, dated Jul. 10, 2013.

* cited by examiner

| | |
|---|---|
| NAME | JIRO SUZUKI |
| FAX NUMBER | xxx-xxx-xxxx |
| E-mail | xxx@xxx.co.jp |
| COMPANY | xxxx Inc. |
| DEPARTMENT | XX-TH DEVELOPMENT UNIT |
| TYPE OF JPB | DEVELOPMENT |
| ADDRESS | xxxxSTREET XXCITY |
| POST CODE | xxx-xxxx |
| EXTENSION | xxx-xxx-xxxx(xxxx) |

FIG.4A

| | |
|---|---|
| NAME | ○○ ○○ |
| FAX NUMBER | ○○○-○○○-○○○○ |
| E-mail | ○○○@○○○.co.jp |

FIG.4B

STATE OF ORIGINAL SETTING

SELECTION KEY

PRESSING SERRCH KEY/ONE TOUCH PRESSING/SPEED DIAL DESIGNATION
STATE OF SEARCHING

STATE OF ADDRESS SELECTION

PRESS CONFIRMATION KEY   PRESS TRANSMISSION KEY   STATE OF DISPLAYING ADDRESS

PRESS TRANSMISSION KEY
STATE OF SCANNING

STATE OF DATA TRANSMISSION

DEVICE, PROGRAM, METHOD AND SYSTEM FOR DATA TRANSMISSION

CROSS-REFERENCE TO RELATED APPLICATION

This application claims priority under 35 U.S.C. §119 from Japanese Patent Application No. 2005-282834, filed on Sep. 28, 2005. The entire subject matters of the application are incorporated herein by reference.

BACKGROUND

1. Technical Field

The present invention relates to a device, program, method and system for data transmission.

2. Related Art

Data transmission devices such as MFPs (Multi Function Peripherals), acquiring personal information from a directory server (LDAP server) and using destination information (FAX number, e-mail address, etc.) included in the acquired personal information for data transmission, are widely known today as described in Japanese Patent Provisional Publication No. 2004-274486.

When a user of such a data transmission device hopes to use the destination information, the user first extracts a necessary item (item necessary for a search) from the directory structure of the directory server and inputs the extracted item as a search criterion. According to the search criterion, the data transmission device makes a search of the directory server and acquires a search result. The destination information is extracted from the search result and used for data transmission.

Meanwhile, the LDAP server generally stores detailed information (company name, department name, etc.) which has been linked with each piece of destination information. The user hoping to check the detailed information after the search for the destination information can make the data transmission device display the detailed information by performing a prescribed operation on the device. By viewing the detailed information, the user can check whether the destination is a proper destination or not.

However, there are cases where no detailed information is included in the search result acquired by the search of the directory server. While the data transmission device is capable of displaying the detailed information in response to the prescribed user operation when the detailed information is included in the search result, the display of the detailed information in response to the user operation is impossible when the detailed information is not included in the search result. In such a case where the detailed information is not displayed, the user can hardly judge whether the display of the detailed information is impossible due to an erroneous user operation or due to the search result not including the detailed information. Under the circumstances, a data transmission device allowing the user to easily recognizing whether the search result includes the detailed information or not has been hoped for.

Further, the user after viewing the detailed information has to close the detailed information screen and it is troublesome to the user to close the screen after every check on the detailed information especially when there are a lot of search results. Therefore, a data transmission device capable of saving the user time and trouble for the check on the detailed information has been awaited.

SUMMARY

Aspects of the present invention are advantageous in that a device, program, method and system for data transmission, capable of letting the user easily recognize whether detailed information is included in currently displayed information or not and saving the user time and trouble for the check on the detailed information, can be provided.

BRIEF DESCRIPTION OF THE ACCOMPANYING DRAWINGS

FIG. 4A shows an example of entry information stored in a database of the directory server.

FIG. 4B shows an example of entry information stored in a storage unit of the MFP.

DETAILED DESCRIPTION

General Overview

Figure 1:
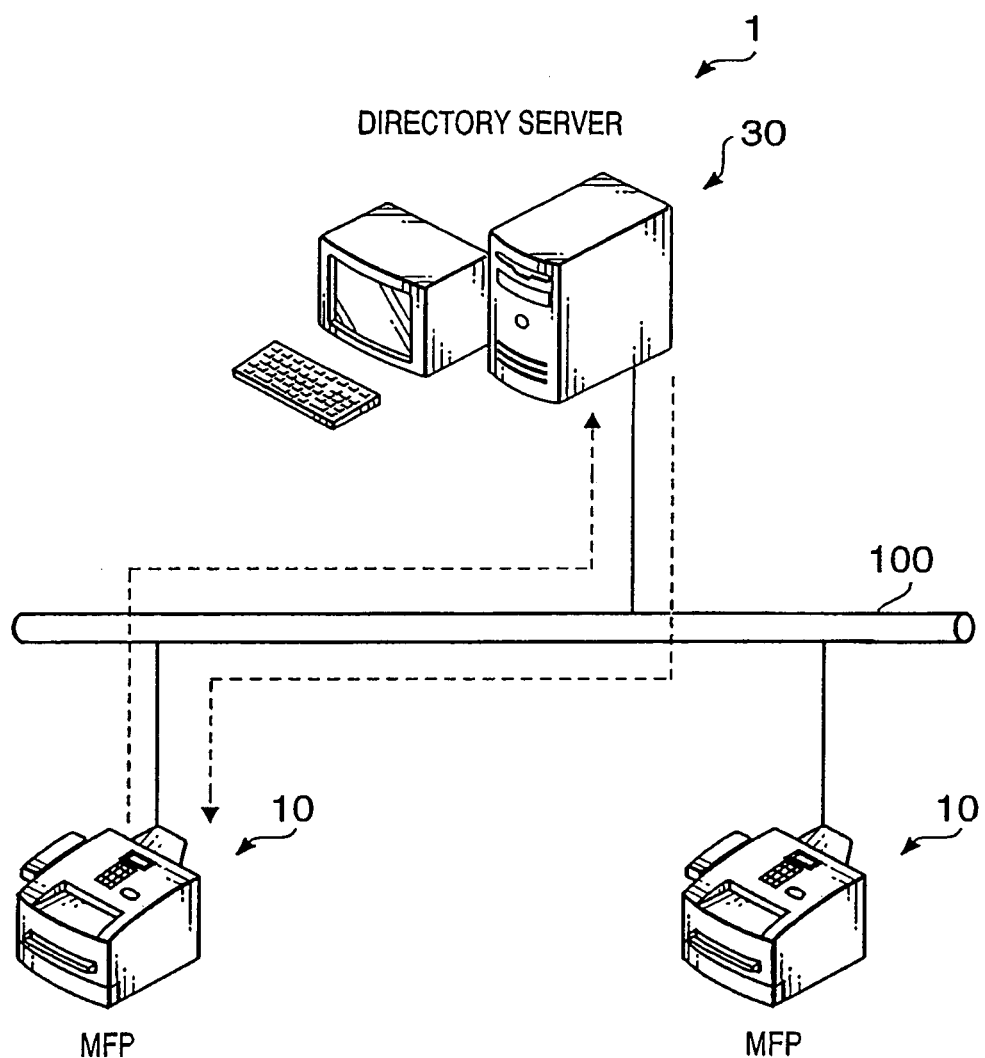
FIG. 1 is a schematic diagram showing a data transmission system in accordance with an embodiment.

It is noted that various connections are set forth between elements in the following description. It is noted that these connections in general and unless specified otherwise, may be direct or indirect and that this specification is not intended to be limiting in this respect. Aspects of the invention may be implemented in computer software as programs storable on computer-readable media including but not limited to RAMs, ROMs, flash memory, EEPROMs, CD-media, DVD-media, temporary storage, hard disk drives, floppy drives, permanent storage, and the like.

In accordance with an aspect of the present invention, there is provided a data transmission device comprising: an entry information acquisition unit which acquires entry information from a storage device; an entry information display unit which displays the acquired entry information on a display device in a style discriminating between entry information including detailed information and entry information not including the detailed information; an entry information selection unit which selects a piece of entry information including the detailed information from the entry information displayed on the display device depending on an input through an input device; a detailed information display unit which displays the detailed information included in the selected entry information on the display device; a destination information acquisition unit which acquires destination information from the selected entry information; and a data transmission unit which executes data transmission using the acquired destination information.

In the above configuration, the entry information is displayed on the display device in a style discriminating between entry information including detailed information and entry information not including the detailed information, by which the user can easily recognize whether each piece of entry information displayed on the display device includes the detailed information or not. Further, when the user hopes to view the detailed information, the user can correctly perform a detailed information display operation (an operation for requesting the display of the detailed information) by selecting entry information including the detailed information without fail. Therefore, the user is prevented from erroneously performing the detailed information display operation for entry information not including the detailed information.

Preferably, the entry information including the detailed information is stored in a directory server while the entry information not including the detailed information is stored in a storage device of the data transmission device. The entry information acquisition unit includes a directory server information acquisition unit which acquires the entry information from the directory server via a communication interface of the data transmission device and a local information acquisition unit which acquires the entry information from the storage device of the data transmission device. The entry information display unit displays the entry information acquired by the directory server information acquisition unit on the display device in a style indicating that the entry information includes the detailed information.

In the above configuration, entry information including the detailed information is stored in the directory server while entry information not including the detailed information is stored in the storage device of the data transmission device. Since the storage capacity of the directory server is generally large while that of the data transmission device is generally small, the entry information including the detailed information (large data amount) is stored in the directory server while the entry information not including the detailed information (small data amount) is stored in the data transmission device, by which memory consumption of the storage device of the data transmission device can be reduced.

Preferably, the entry information display unit displays the entry information including the detailed information on the display device in the style discriminating it from entry information not including the detailed information by displaying a characteristic of an element of the input device necessary for an operation for requesting the display of the detailed information together with the entry information including the detailed information.

In the above configuration, a characteristic of an element of the input device necessary for the detailed information display operation (the operation for requesting the display of the detailed information) is displayed on the display device together with the entry information including the detailed information, by which the user can quickly recognize which element of the input device should be operated for the display of the detailed information.

Preferably, the detailed information display unit displays a characteristic of an element of the input device necessary for an operation for stopping the display of the detailed information together with the detailed information.

With the above configuration, the user can quickly recognize which element of the input device should be operated for stopping the display of the detailed information.

In accordance with another aspect of the present invention, there is provided a data transmission device comprising: an entry information acquisition unit which acquires entry information from a storage device; an entry information display unit which displays the acquired entry information on a display device; an entry information selection unit which selects a piece of entry information including detailed information from the entry information displayed on the display device depending on an input through an input device; a detailed information display unit which displays the detailed information included in the selected entry information on the display device; a detailed information display cancellation unit which stops the display of the detailed information in response to a prescribed time period having passed since the start of the display of the detailed information; a destination information acquisition unit which acquires destination information from the selected entry information; and a data transmission unit which executes data transmission using the acquired destination information.

With the above configuration, the display of the detailed information is stopped in response to a prescribed time period having passed since the start of the display of the detailed information, by which the user is relieved of the need of closing the detailed information screen after each check on the detailed information.

Preferably, the entry information display unit displays the entry information again in response to the prescribed time period having passed since the start of the display of the detailed information.

With the above configuration, the display on the display device is returned to the display of the entry information (e.g. a list of names of possible destinations) when the prescribed time period has passed since the start of the display of the detailed information, by which the user is relieved of the need of closing the detailed information screen after each check on the detailed information. Further, the automatic return to the original screen (displaying the entry information) is convenient especially when the user has to check the detailed information on many pieces of entry information.

Preferably, the data transmission device further comprises a detailed information enforced display unit which displays the detailed information on the display device for a prescribed time period before the data transmission by the data transmission unit in response to an operation for requesting the data transmission being performed by a user while the entry information including the detailed information is displayed on the display device.

In the above configuration, when the selected entry information includes the detailed information, the detailed information is necessarily displayed on the display device for a prescribed time period before the data transmission is executed by the data transmission unit, by which the probability of erroneous setting of the destination is reduced.

Preferably, the entry information display unit displays the acquired entry information on the display device in a style discriminating between entry information including detailed information and entry information not including the detailed information.

With the above configuration, the user can easily recognize whether each piece of entry information displayed on the display device includes the detailed information or not. The user hoping to view the detailed information can correctly perform the detailed information display operation by selecting entry information including the detailed information without fail, by which the user is prevented from erroneously performing the detailed information display operation for entry information not including the detailed information.

In accordance with another aspect of the present invention, there is provided a data transmission device comprising: an entry information acquisition unit which acquires entry information from a storage device; an entry information display unit which displays the acquired entry information on a display device; an entry information selection unit which selects a piece of entry information including detailed information from the entry information displayed on the display device depending on an input through an input device; a detailed information display unit which displays the detailed information included in the selected entry information on the display device; a destination information acquisition unit which acquires destination information from the selected entry information; and a data transmission unit which executes data transmission using the acquired destination information.

With the above configuration, the user can check the detailed information on the entry information selected as entry information including the destination information (entry information regarding the destination). Specifically, when the user selects a particular piece of entry information from the entry information (acquired by the entry information acquisition unit) displayed on the display device, the detailed information on the selected entry information can be displayed on the display device.

In accordance with another aspect of the present invention, there is provided a data transmission device comprising: an entry information acquisition unit which acquires entry information from a storage device; an entry information display unit which displays the acquired entry information on a display device; an entry information selection unit which selects a piece of entry information including detailed information from the entry information displayed on the display device depending on an input through an input device; a detailed information display unit which displays the detailed information included in the selected entry information on the display device; a detailed display destination determination unit which determines the entry information including the detailed information being displayed on the display device as entry information regarding a destination based on an input being made through an input device; a destination information acquisition unit which acquires destination information from the entry information regarding the destination determined by the detailed display destination. determination unit; and a data transmission unit which executes data transmission using the acquired destination information.

With the above configuration, the user checking the detailed information on the selected entry information can immediately determine the selected entry information as entry information regarding the destination by making an input through the input device. In other words, when the user viewing the detailed information performs a data transmission operation, data transmission to the destination corresponding to the detailed information is executed immediately by the data transmission unit. Therefore, the user is relieved of the need of returning to the original screen before the data transmission, by which improved operability is realized.

Preferably, the entry information display unit displays the acquired entry information on the display device in a style discriminating between entry information including detailed information and entry information not including the detailed information.

With the above configuration, the user can easily recognize whether each piece of entry information displayed on the display device includes the detailed information or not. The user hoping to view the detailed information can correctly perform the detailed information display operation by selecting entry information including the detailed information, without fail, by which the user is prevented from erroneously performing the detailed information display operation for entry information not including the detailed information.

In accordance with another aspect of the present invention, there is provided a computer program product comprising computer-readable instructions that cause a computer to function as: an entry information acquisition unit which acquires entry information from a storage device; an entry information display unit which displays the acquired entry information on a display device in a style discriminating between entry information including detailed information and entry information not including the detailed information; an entry information selection unit which selects a piece of entry information including the detailed information from the entry information displayed on the display device depending on an input through an input device; a detailed information display unit which displays the detailed d information included in the selected entry information on the display device; a destination information acquisition unit which acquires destination information from the selected entry information; and a destination information supply unit which supplies the acquired destination information to a data transmission unit which executes data transmission using the destination information.

With the above configuration, the user can easily recognize whether each piece of entry information displayed on the display device includes the detailed information or not. The user hoping to view the detailed information can correctly perform the detailed information display operation by selecting entry information including the detailed information without fail, by which the user is prevented from erroneously performing the detailed information display operation for entry information not including the detailed information.

In accordance with another aspect of the present invention, there is provided a computer program product comprising computer-readable instructions that cause a computer to function as: an entry information acquisition unit which acquires entry information from a storage device; an entry information display unit which displays the acquired entry information on a display device; an entry information selection unit which selects a piece of entry information including detailed information from the entry information displayed on the display device depending on an input through an input device; a detailed information display unit which displays the detailed information included in the selected entry information on the display device; a detailed information display cancellation unit which stops the display of the detailed information in response to a prescribed time period having passed since the start of the display of the detailed information; a destination information acquisition unit which acquires destination information from the selected entry information; and a destination information supply unit which supplies the acquired destination information to a data transmission unit which executes data transmission using the destination information.

With the above configuration, the display of the detailed information is stopped when a prescribed time period has passed since the start of the display of the detailed information, by which the user is relieved of the need of closing the detailed information screen after each check on the detailed information.

In accordance with another aspect of the present invention, there is provided a computer program product comprising computer-readable instructions that cause a computer to function as: an entry information acquisition unit which acquires entry information from a storage device; an entry information display unit which displays the acquired entry information on a display device; an entry information selection unit which selects a piece of entry information including detailed information from the, entry information displayed on the display device depending, on an input through an input device; a detailed information display unit which displays the detailed information included in the selected entry information on the display device; a destination information acquisition unit which acquires destination information from the selected entry information; and a destination information supply unit which supplies the acquired destination information to a data transmission unit which executes data transmission using the destination information.

With the above configuration, the user can check the detailed information on the entry information selected as the entry information including the destination information. When the user selects a particular piece of entry information from the entry information displayed on the display device, the detailed information on the selected entry information can be displayed on the display device.

In accordance with another aspect of the present invention, there is provided a computer program product comprising computer-readable instructions that cause a computer to function as: an entry information acquisition unit which acquires entry information from a storage device; an entry information display unit which displays the acquired entry information on a display device; an entry information selection unit which selects a piece of entry information including detailed information from the entry information displayed on the display device depending on an input through an input device; a detailed information display unit which displays the detailed information included in the selected entry information on the display device; a detailed display destination determination unit which determines the entry information including the detailed information being displayed on the display device as entry information regarding a destination in response to an input being made through an input device; a destination information acquisition unit which acquires destination information from the entry information regarding the destination determined by the detailed display destination determination unit; and a destination information supply unit which supplies the acquired destination information to a data transmission unit which executes data transmission using the destination information.

With the above configuration, the user checking the detailed information on the selected entry information can immediately determine the selected entry information as entry information regarding the destination. When the user viewing the detailed information performs the data transmission operation, data transmission to the destination corresponding to the detailed information is executed immediately. The user is relieved of the need of returning to the original screen before the data transmission, by which improved operability is realized.

In accordance with another aspect of the present invention, there is provided a data transmission method comprising: an entry information acquisition step of acquiring entry information from a storage device; an entry information display step of displaying the acquired entry information on a display device in a style discriminating between entry information including detailed information and entry information not including the detailed information; an entry information selection step of selecting a piece of entry information including the detailed information from the entry information displayed on the display device depending on an input through an input device; a detailed information display step of displaying the detailed information included in the selected entry information on the display device; a destination information acquisition step of acquiring destination information from the selected entry information; and a data transmission step of executing data transmission using the acquired destination information.

With the above configuration, the user can easily recognize whether each piece of entry information displayed on the display device includes the detailed information or not. The user hoping to view the detailed information can correctly perform the detailed information display operation by selecting entry information including the detailed information without fail, by which the user is prevented from erroneously performing the detailed information display operation for entry information not including the detailed information.

In accordance with another aspect of the present invention, there is provided a data transmission method comprising: an entry information acquisition step of acquiring entry information from a storage device; an entry information display step of displaying the acquired entry information on a display device; an entry information selection step of selecting a piece of entry information including detailed information from the entry information displayed on the display device depending on an input through an input device; a detailed information display step of displaying the detailed information included in the selected entry information on the display device; a detailed information display cancellation step of stopping the display of the detailed information in response to a prescribed time period having passed since the start of the display of the detailed information; a destination information acquisition step of acquiring destination information from the selected entry information; and a data transmission step of executing data transmission using the acquired destination information.

With the above configuration, the display of the detailed information is stopped when a prescribed time period has passed since the start of the display of the detailed information, by which the user is relieved of the need of closing the detailed information screen after each check on the detailed information.

In accordance with another aspect of the present invention, there is provided a data transmission method comprising: an entry information acquisition step of acquiring entry information from a storage device; an entry information display step of displaying the acquired entry information on a display device; an entry information selection step of selecting a piece of entry information including detailed information from the entry information displayed on the display device depending on an input through an input device; a detailed information display step of displaying the detailed information included in the selected entry information on the display device; a destination information acquisition step of acquiring destination information from the selected entry information; and a data transmission step of executing data transmission using the acquired destination information.

With the above configuration, the user can check the detailed information on the entry information selected as the entry information including the destination information. When the user selects a particular piece of entry information from the entry information displayed on the display device, the detailed information on the selected entry information can be displayed on the display device.

In accordance with another aspect of the present invention, there is provided a data transmission method comprising: an entry information acquisition step of acquiring entry information from a storage device; an entry information display step of displaying the acquired entry information on a display device; an entry information selection step of selecting a piece of entry information including detailed information from the entry information displayed on the display device depending on an input through an input device; a detailed information display step of displaying the detailed information included in the selected entry information on the display device; a detailed display destination determination step of determining the entry information including the detailed information being displayed on the display device as entry information regarding a destination in response to an input being made through an input device; a destination information acquisition step of acquiring destination information from the entry information regarding the destination determined by the detailed display destination determination step; and a data transmission step of executing data transmission using the acquired destination information.

With the above configuration, the user checking the detailed information on the selected entry information can immediately determine the selected entry information as entry information regarding the destination. When the user viewing the detailed information performs the data transmission operation, data transmission to the destination corresponding to the detailed information is executed immediately. The user is relieved of the need of returning to the original screen before the data transmission, by which improved operability is realized.

In accordance with another aspect of the present invention, there is provided a data transmission system comprising a data transmission device and a directory server, wherein the data transmission device includes: an entry information acquisition unit which acquires entry information including detailed information from the directory server while acquiring entry information not including the detailed information from the data transmission device; an entry information display unit which displays the acquired entry information on a display device in a style discriminating between entry information including the detailed information and entry information not including the detailed information; an entry information selection unit which selects a piece of entry information including the detailed information from the entry information displayed on the display device depending on an input through an input device; a detailed information display unit which displays the detailed information included in the selected entry information on the display device; a destination information acquisition unit which acquires destination information from the selected entry information; and a data transmission unit which executes data transmission using the acquired destination information.

With the above configuration, the user of the data transmission device can easily recognize whether each piece of entry information displayed on the display device includes the detailed information or not. The user hoping to view the detailed information can correctly perform the detailed information display operation by selecting entry information including the detailed information without fail, by which the user is prevented from erroneously performing the detailed information display operation for entry information not including the detailed information.

In accordance with another aspect of the present invention, there is provided a data transmission system comprising a data transmission device and a directory server, wherein the data transmission device includes: an entry information acquisition unit which acquires entry information including detailed information from the directory server while acquiring entry information not including the detailed information from the data transmission device; an entry information display unit which displays the acquired entry information on a display device; an entry information selection unit which selects a piece of entry information including the detailed information from the entry information displayed on the display device depending on an input through an input device; a detailed information display unit which displays the detailed information included in the selected entry information on the display device; a detailed information display cancellation unit which stops the display of the detailed information in response to a prescribed time period having passed since the start of the display of the detailed information; a destination information acquisition unit which acquires destination information from the selected entry information; and a data transmission unit which executes data transmission using the acquired destination information.

With the above configuration, the display of the detailed information is stopped when a prescribed time period has passed since the start of the display of the detailed information, by which the user of the data transmission device is relieved of the need of closing the detailed information screen after each check on the detailed information.

In accordance with another aspect of the present invention, there is provided a data transmission system comprising a data transmission device and a directory server, wherein the data transmission device includes: an entry information acquisition unit which acquires entry information including detailed information from the directory server while acquiring entry information not including the detailed information from the data transmission device; an entry information display unit which displays the acquired entry information on a display device; an entry information selection unit which selects a piece of entry information including the detailed information from the entry information, displayed on the display device depending on an input through an input device; a detailed information display unit which displays the detailed information included in the selected entry information on the display device; a destination information acquisition unit which acquires destination information from the selected entry information; and a data transmission unit which executes data transmission using the acquired destination information.

With the above configuration, the user of the data transmission device can check the detailed information on the entry information selected as the entry information including the destination information. When the user selects a particular piece of entry information from the entry information displayed on the display device, the detailed information on the selected entry information can be displayed on the display device.

In accordance with another aspect of the present invention, there is provided a data transmission system comprising a data transmission device and a directory server, wherein the data transmission device includes: an entry information acquisition unit which acquires entry information including detailed information from the directory server while acquiring entry information not including the detailed information from the data transmission device; an entry information display unit which displays the acquired entry information on a display device; an entry information selection unit which selects a piece of entry information including the detailed information from the entry information displayed on the display device depending on an input through an input device; a detailed information display unit which displays the detailed information included in the selected entry information on the display device; a detailed display destination determination unit which determines the entry information including the detailed information being displayed on the display device as entry information regarding a destination based on an input being made through an input device; a destination information acquisition unit which acquires destination information from the entry information regarding the destination determined by the detailed display destination determination unit; and a data transmission unit which executes data transmission using the acquired destination information.

With the above configuration, the user of the data transmission device checking the detailed information on the selected entry information can immediately determine the selected entry information as entry information regarding the destination. When the user viewing the detailed information performs the data transmission operation, data transmission to the destination corresponding to the detailed information is executed immediately. The user is relieved of the need of returning to the original screen before the data transmission, by which improved operability is realized.

Embodiment

Referring now to the drawings, a description will be given in detail of a preferred embodiment in accordance with the present invention.

Data transmission devices in accordance with the present invention can include facsimile machines, MFPs (Multi Function Peripherals (having multiple functions such as the facsimile function, e-mail transmission function, printer function, scanner function and copy function in one body)), etc. In the following embodiment, an example of a data transmission system including MFPs (as the data transmission devices) and a terminal device (directory server) connected together by a network will be described in detail.

FIG. 1 is a schematic diagram showing a data transmission system in accordance with an embodiment of the present invention. In the data transmission system 1 of FIG. 1, MFPs 10 as data transmission devices are connected to a directory server 30 storing entry information including destination information (e.g. LDAP (Lightweight Directory Access Protocol) server) via a wired communication network 100. The wired communication network 100 can be implemented by serial communication cables, parallel communication cables, LAN cables, etc. Incidentally, the wired communication network 100 may be replaced with a wireless communication network.

Figure 2:
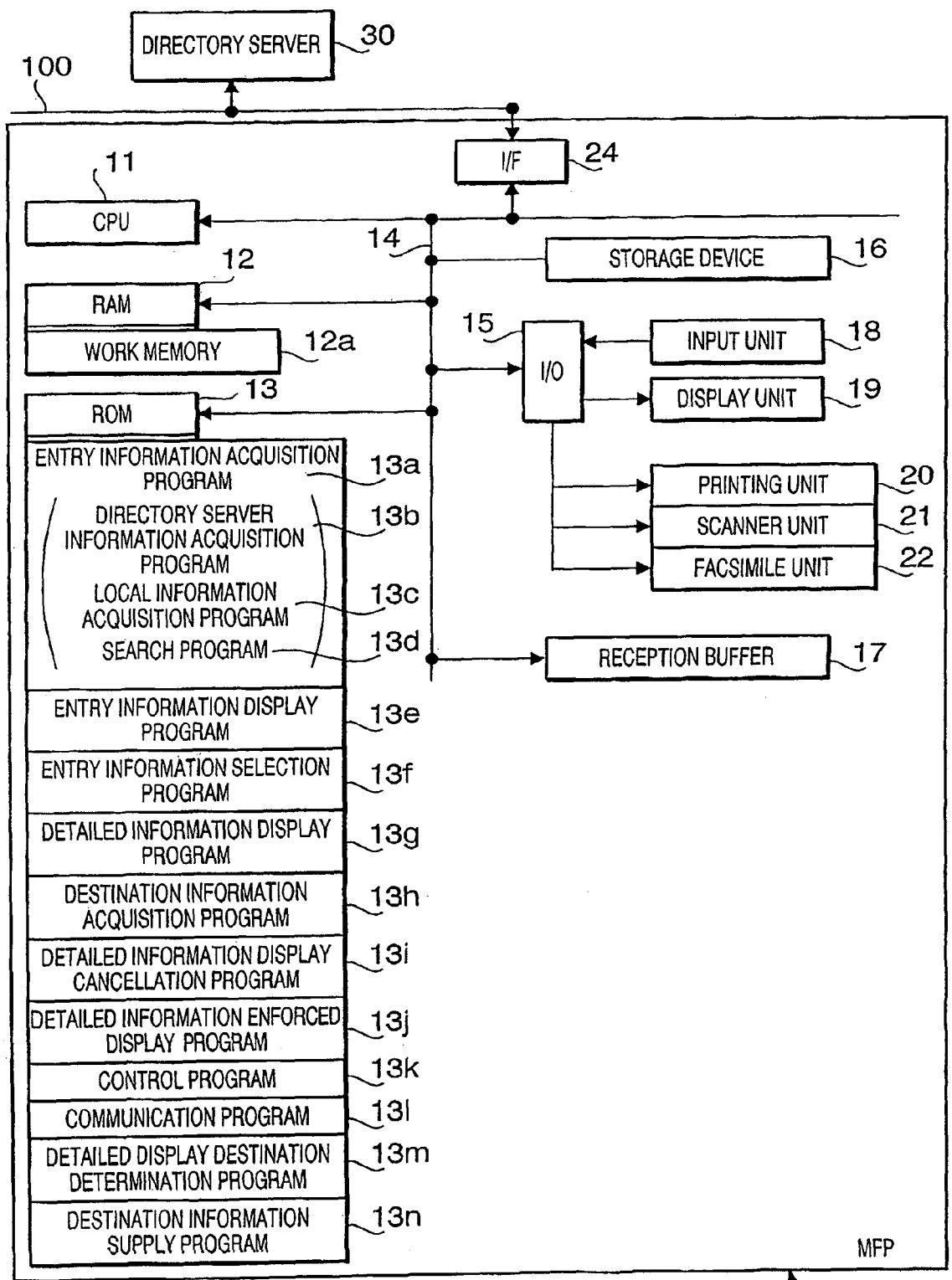
FIG. 2 is a block diagram showing the electrical configuration of an MFP (Multi Function Peripheral) included in the data transmission system of FIG. 1.

FIG. 2 is a block diagram showing the electrical configuration of the MFP 10. The MFP 10 includes a CPU (Central Processing Unit) 11, a RAM (Random Access Memory) 12 including a work memory 12a, a ROM (Read Only Memory) 13 storing various programs, a bus line 14, an I/O (Input/Output) unit 15, a storage unit 16 (implemented by a hard disk or a nonvolatile memory like an EEPROM (Electrically Erasable Programmable ROM)), a reception buffer memory 17 for temporarily storing print control data received from other devices on the wired communication network 100 (hereinafter referred to simply as a "reception buffer 17"), an input unit 18 (having a touch panel, push button switches, numeric keys, etc.), a display unit 19 (having an LCD (Liquid Crystal Display), etc.), a print unit 20 (implemented by a well-known inkjet printing mechanism, laser printing mechanism, thermal transfer printing mechanism or dot impact printing mechanism, for example), a scanner unit 21, a FAX unit 22, and a communication I/F (interface) 24. The input unit 18, the display unit 19, the print unit 20, the scanner unit 21 and the FAX unit 22 are connected to the I/O unit 15. The communication I/F 24, as an interface for wired communication, is connected to the wired communication network 100 to communicate data with the directory server 30, etc. The ROM 13 stores an entry information acquisition program 13a, an entry information display program 13e, an entry information selection program 13f, a detailed information display program 13g, a destination information acquisition program 13h, a detailed information display cancellation program 13i, a detailed information enforced display program 13j, a control program 13k, a communication program 13l, a detailed display destination determination program 13m, and a destination information supply program 13n. The entry information acquisition program 13a includes a directory server information acquisition program 13b, a local information acquisition program 13c and a search program 13d.

Figure 11A:
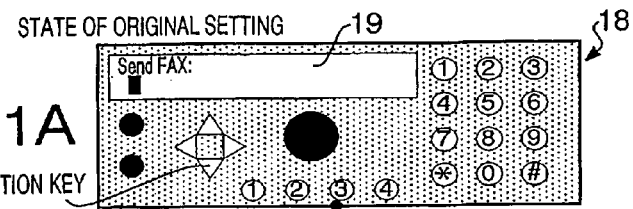
FIGS. 11A-11F are schematic diagram showing examples of user operations on an input unit of the MFP and displays on the display unit of the MFP.
Figure 11B:
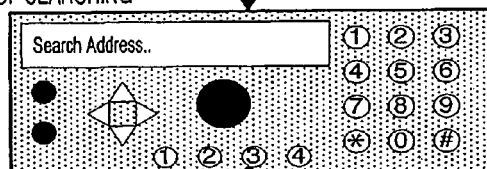
Figure 11C:
Figure 11D:
Figure 11E:
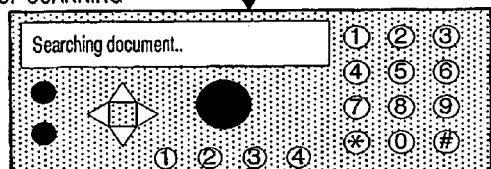
Figure 11F:
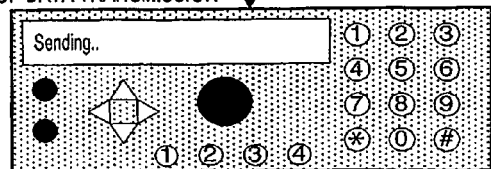

Here, the input unit 18 and the display unit 19 of the MFP 10 will be explained briefly referring to FIGS. 11A-11F. The input unit 18 and the display unit 19 are formed integrally with the MFP 10. The input unit 18 has numeric keys, alphabet keys (unshown), selection keys (rightward triangle key, leftward triangle key, upward triangle key and downward triangle key), a confirmation key (OK key), a transmission key, etc. The keys of the input unit 18 are pressed by the user of the MFP 10 for starting the operations shown in FIGS. 11A-11F. On the display unit 19, the destination information and names (of destinations) extracted from the entry information are displayed. FIG. 11A shows a state where an original is set. FIG. 11B shows a state where the searching is executed. FIG. 11C shows a state where the user is selecting an address. FIG. 11D shows a state where the selected address is displayed. FIG. 11E shows a state where the scanning is executed after the transmission key is pressed. FIG. 11F shows a state of executing data transmission.

Referring again to FIG. 2, in the MFP 10 as the data transmission device of this embodiment, the print unit 20, the scanner unit 21 (used for copying and image reading) and the FAX unit 22 are connected to the I/O unit 15 to be controlled by the CPU 11. The operations of the print unit 20, the scanner unit 21 and the FAX unit 22 (operating in well-known manners) are controlled by the CPU 11 executing the control program 13k loaded from the ROM 13 into the work memory 12a of the RAM 12.

The MFP 10 has an e-mail transmission/reception function for transmitting and receiving e-mails (including print image data) to/from other devices via the wired communication network 100 and external communication networks connected to the wired communication network 100. The e-mail transmission/reception function is controlled by the CPU 11 executing the communication program 13l (well-known program for e-mail transmission/reception) stored in the ROM 13.

Figure 3:
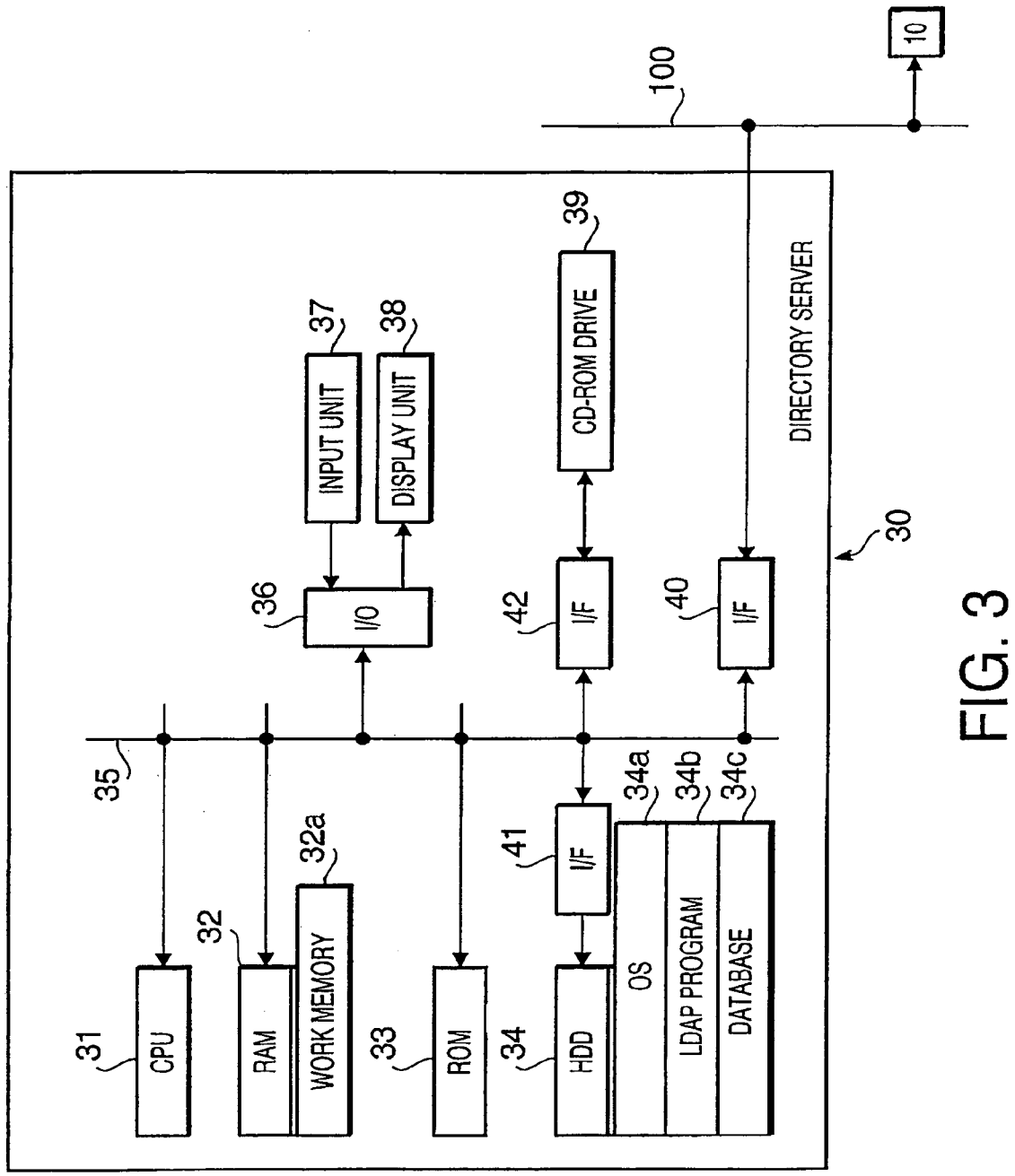
FIG. 3 is a block diagram showing the electrical configuration of a directory server included in the data transmission system of FIG. 1.

FIG. 3 is a block diagram showing the electrical configuration of the directory server 30. The directory server 30 is implemented by a personal computer (or a workstation) including a CPU 31, a RAM 32 including a work memory 32a, a ROM 33 storing various programs, an HDD (Hard Disk Drive) 34 as a storage unit, a bus line 35, an I/O unit 36, a CD-ROM drive 39 and a communication I/F 40. The communication I/F 40, as an interface for wired communication, is connected to the wired communication network 100 to communicate data (print control data, etc.) with the MFPs 10, etc. The HDD 34 and the CD-ROM drive 39 are connected to the bus line 35 via an I/F 41 and an I/F 42, respectively. The HDD 34 stores an OS (Operating System) 34a as basic software of the directory server 30, an LDAP program 34b for implementing a function as an LDAP server, a database 34c of the entry information, etc. To the I/O unit 36, an input/operation device 37 (keyboard, mouse, etc.) and a display device 38 (LCD, CRT, etc.) are connected.

Incidentally, the "entry information" means information including the name of a destination and the destination information (FAX number, e-mail address, etc.). The entry information can be classified into two types: entry information including detailed information (company name, department name, job type, address, postal code (zip code), company extension number, etc.) and entry information not including the detailed information.

In this embodiment, the directory server 30 is configured as an LDAP server which can be accessed by use of LDAP (Lightweight Directory Access Protocol). The directory server 30 is provided with the database 34c which stores the entry information including the destination information. FIG. 4A shows an example of the entry information stored in the database 34c. As shown in FIG. 4A, the entry information stored in the database 34c includes the name of the destination, the destination information (FAX number, e-mail address) and the detailed information (company name, department name, job type & managerial position, address, postal code, company, extension number), which are associated with one another and stored as a piece of data (record). Meanwhile, FIG. 4B shows an example of the entry information stored in the storage unit 16 of the MFP 10. As shown in FIG. 4B, the MFP 10 stores the name and the destination information (FAX number, e-mail address) only as the entry information. As above, the entry information including the detailed information is stored in the HDD 34 (storage unit) of the directory server 30 having a high storage capacity while the entry information not including the detailed information is stored in the storage unit 16 of the MFP 10 having a relatively low storage capacity, by which memory consumption of the storage unit 16 (of a low storage capacity) can be reduced. When the storage unit 16 of the MFP 10 has a high storage capacity, the entry information including the detailed information may be stored in the storage unit 16.

Referring again to FIG. 2, the entry information acquisition program 13a is a program executed by the CPU 11 of the MEP 10 for acquiring the entry information stored in the directory server 30 or the entry information stored in the storage unit 16 of the MFP 10 when the MFP 10 transmits a FAX, etc.

The entry information display program 13e is a program for displaying the acquired entry information, on the display unit 19. The display on the display unit 19 is made in a style discriminating between entry information including the detailed information and entry information not including the detailed information.

The entry information selection program 13f is a program for selecting a piece of entry information including the detailed information from multiple pieces of entry information acquired and displayed on the display device depending on a user operation and thereby acquiring the detailed information. The detailed information is displayed on the display unit 19 by the detailed information display program 13g.

The destination information acquisition program 13h is a program for acquiring the destination information according to a user operation. The transmission of a FAX or e-mail is carried out using the acquired destination information.

The detailed information display cancellation program 13i and the detailed information enforced display program 13j are programs for canceling or forcibly executing the display of the detailed information, as will be explained later.

The detailed display destination determination program 13m is a program which determines to transmit data to a destination corresponding to the detailed information displayed on the display unit 19 when a "data transmission operation" is performed by the user while the detailed information is displayed on the display unit 19.

The destination information supply program 13n is a program which enables the transmission of a FAX or e-mail to the destination by supplying the destination information to the communication program 131.

The CPU 11 of the MFP 10 implements the above functions by loading the entry information display program 13e, the entry information selection program 13f, the detailed information display program 13g, the destination information acquisition program 13h, the detailed information display cancellation program 13i, the detailed information enforced display program 13j, the detailed display destination determination program 13m and the destination information supply program 13n from the ROM 13 into the work memory 12a and executing the loaded programs.

Figure 5:
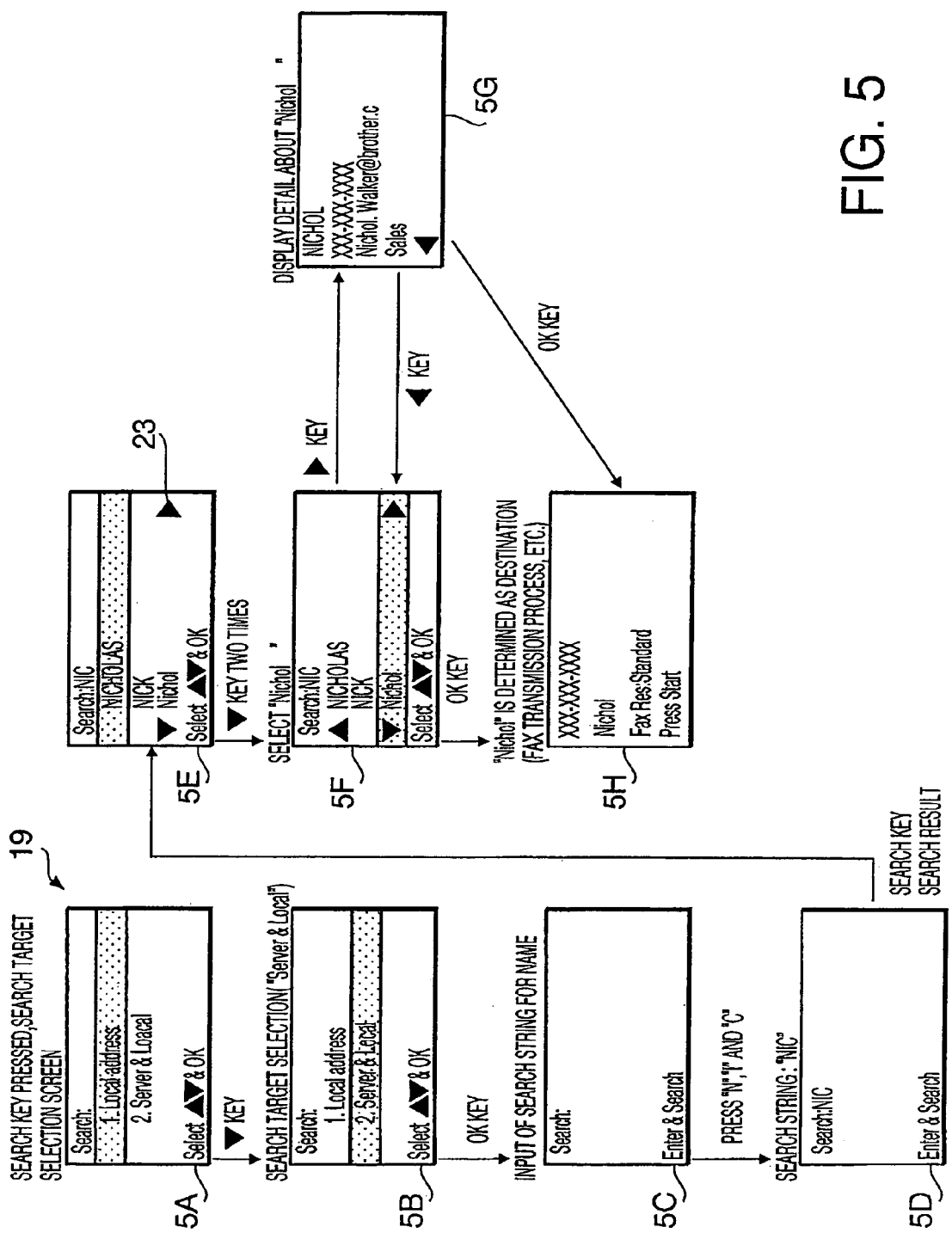
FIG. 5 is a schematic diagram showing screens displayed on a display unit of the MFP in a first example.
Figure 6:
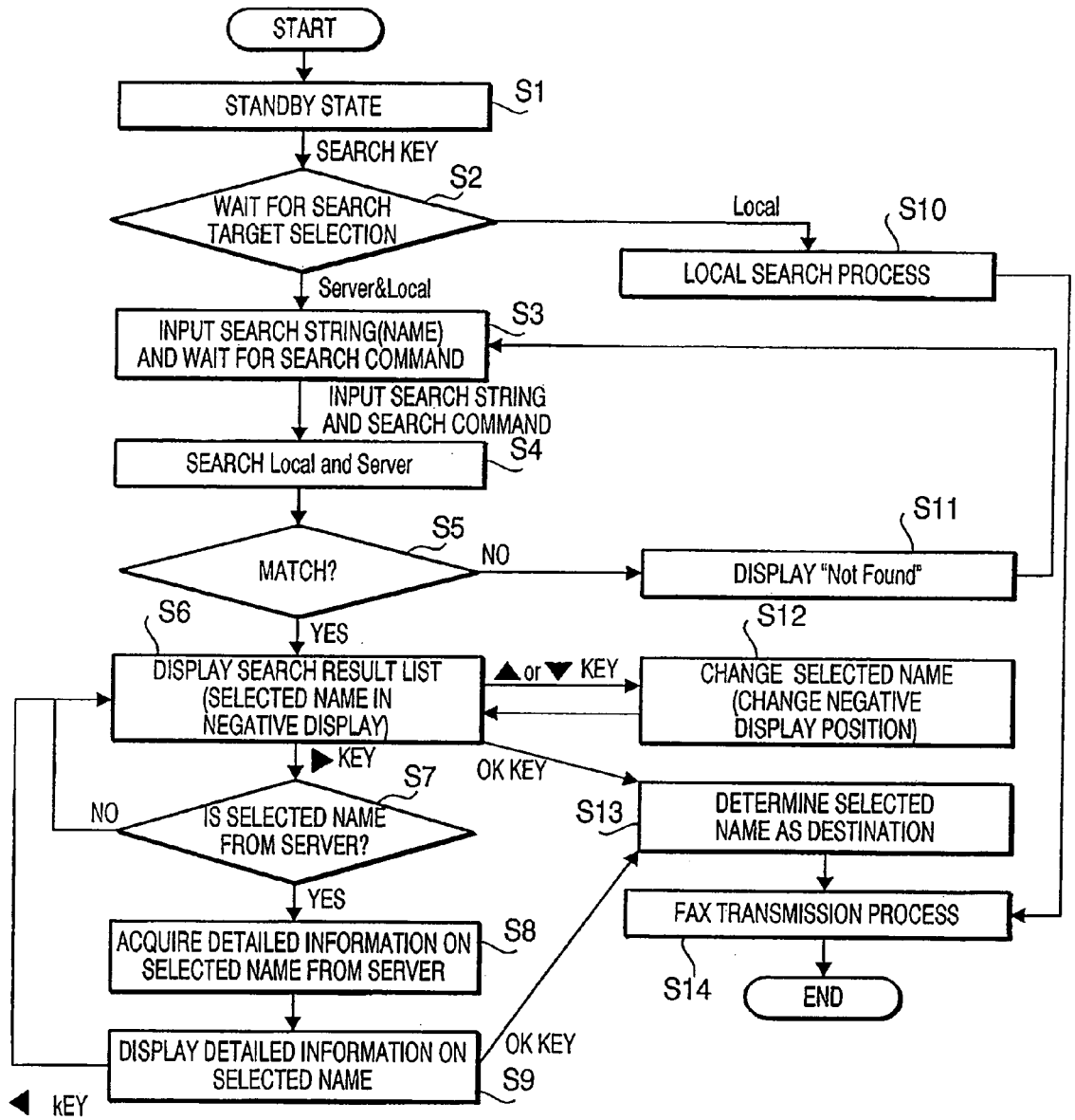
FIG. 6 is a flow chart showing the operation of the MFP in the first example.

In the following, an example of the operation of the MFP 10 will be described referring to FIGS. 5 and 6. FIG. 5 is a schematic diagram showing screens displayed on the display unit 19 of the MFP 10 in the first example. FIG. 6 is a flow chart showing the operation of the MFP 10 in the first example.

As shown in FIG. 6, the MFP 10 first stays in a standby state (SI). When a search key (unshown) is pressed by the user, the process advances to step S2 and a screen 5A shown in FIG. 5 is displayed on the display unit 19. In this step, the user selects a search range (search target) from "1. Local address" and "2. Server & Local" by operating the selection keys (upward triangle key, downward triangle key) and the confirmation key (OK key). The item "1. Local address" is for requesting the acquisition of the entry information from the MFP 10 only, while the item "2. Server & Local" is for requesting the acquisition of the entry information from both the directory server 30 and the MFP 10. The acquisition of the entry information from the MFP 10 only has the advantage of high speed information acquisition even though the search range is narrower. Meanwhile, the acquisition of the entry information from both the directory server 30 and the MFP 10 has the advantage of a wider search range even though the information acquisition via the wired communication network 100 takes a relatively long time.

When the item "2. Server & Local" is selected by the user, the process advances to step S3 and a screen 5C shown in FIG. 5 for inputting a search string (search criterion) and issuing a search instruction is displayed on the display unit 19. When the user inputs a search string "NIC", for example, through the input unit 18 and presses the search key as shown in "5D" of FIG. 5, the CPU 11 searches both the database 34c of the directory server 30 and the storage unit 16 of the MFP 10 for entry information satisfying the search criterion and acquires the entry information if such entry information is found (S4). The step S4 is implemented by the CPU 11 by executing the entry information acquisition program 13a(including the directory server information acquisition program 13b, the local information acquisition program 13c and the search program 13d) stored in the ROM 13.

When entry information satisfying the search criterion is found (S5: YES), the CPU 11 displays a search result list (screen 5E shown in FIG. 5, indicating each name included in each piece of entry information found by the above search) on the display unit 19 (S6). The steps S5 and S6 are implemented by the CPU 11 by executing the entry information display program 13e stored in the ROM 13. When no entry information satisfying the search criterion is found (S5: NO), the CPU 11 displays a message "Not Found" on the display unit 19 (S11) and returns to the step S3 to wait for a new search criterion. Incidentally, a rightward triangle 23 is displayed to the right of the name (included in a piece of entry information found by the search) on the screen 5E when the entry information includes the detailed information, while no rightward triangle 23 is displayed to the right of the name when the entry information includes no detailed information, by which the user can easily distinguish between entry information including the detailed information and entry information not including the detailed information at a glance.

By pressing the upward triangle key and the downward triangle key, the user can select a desired search result (entry information) from the search result list. The selected search result is displayed in negative display (highlighted display) on the screens 5E and 5F (S12). While a name "NICHOLAS" has been displayed in negative display in the screen 5E, the user can select a different name "Nichol" (the second name below "NICHOLAS") by pressing the downward triangle key twice as shown in the screen 5F. In this state, when the rightward triangle key is pressed by the user, the CPU 11 judges whether the selected name was acquired from the directory server 30 or not, that is, whether the selected entry information includes the detailed information or not (S7). If the selected name was acquired from the directory server 30 (S7: YES), the CPU 11 acquires the detailed information associated with the selected name from the directory server 30 (S8). The steps S12, S7 and S8 are implemented by the CPU 11 by executing the entry information selection program 13f stored in the ROM 13.

Subsequently, the CPU 11 displays the acquired detailed information (screen 5G shown in FIG. 5) on the display unit 19 by executing the detailed information display program 13g stored in the ROM 13 (S9). By viewing the detailed information screen 5G the user can check whether the destination of data transmission is a correct destination or not. Incidentally, the appearance (graphical characteristics) of the rightward triangle 23 (displayed on the screens 5E and 5F for discriminating between entry information including the detailed information and entry information not including the detailed information) is identical with that of the rightward triangle key (one of the selection keys) to be actually pressed by the user, by which the user can quickly recognize. which key of the input unit 18 (formed as a keyboard) should be pressed for requesting the display of the detailed information. The "characteristics" of an element (e.g. key) of the input unit 18 displayed on the display unit 19 may include color, number, size, etc., instead of the shape of the element.

After the detailed information (screen 5G) is displayed on the display unit 19, when the leftward triangle key of the input unit 18 is pressed by the user, the process returns to the step S6 and the search result list (screen 5F) is displayed again. Incidentally, the detailed information screen 5G has a leftward triangle displayed thereon. The leftward triangle displayed on the detailed information screen 5G has an appearance (graphical characteristics) similar to that of the leftward triangle key (one of the selection keys), by which the user can quickly recognize which key of the input unit 18 should be pressed for canceling the detailed information screen 5G and returning to the screen 5F. When the confirmation key (OK key) is pressed by the user while the screen 5F is displayed, the CPU 11 determines to transmit data to the destination associated with the detailed information displayed on the detailed information screen 5G (S13). In this step, the CPU 11 acquires the destination information from the entry information by executing the destination information acquisition program 13h stored in the ROM 13. Subsequently, the CPU 11 executes FAX transmission as shown in "5H" of FIG. 5 (S14). Incidentally, when the confirmation key (OK key) is pressed by the user-while the detailed information screen 5G is displayed, the display changes into the screen 5H and the FAX transmission is started (the process advances from S9 to S13) without returning to the screen 5F, by which the user is allowed to perform the FAX transmission operation quickly, without the need of returning from the detailed information screen 5G to the screen 5F.

In the case where the confirmation key (OK key) is pressed while the detailed information screen 5G is displayed on the display unit 19, the detailed display destination determination program 13m is executed by the CPU 11, by which the display is directly switched to the screen 5H and the FAX transmission process is executed without returning to the screen 5F (S9, S13, S14). In other word, the user can perform the FAX transmission operation immediately on the detailed information screen 5G without the need of returning to the screen 5F, by which improved operability is realized.

When the item "1. Local address" is selected by the user in the step S2, the rightward triangle 23 is not displayed on the screen 5E or 5F (that is, the display of the entry information in the style discriminating between entry information including the detailed information and entry information not including the detailed information is not made) since only the entry information not including the detailed information is acquired in this case. Therefore, the detailed information screen 5G is never displayed in this case.

Figure 7:
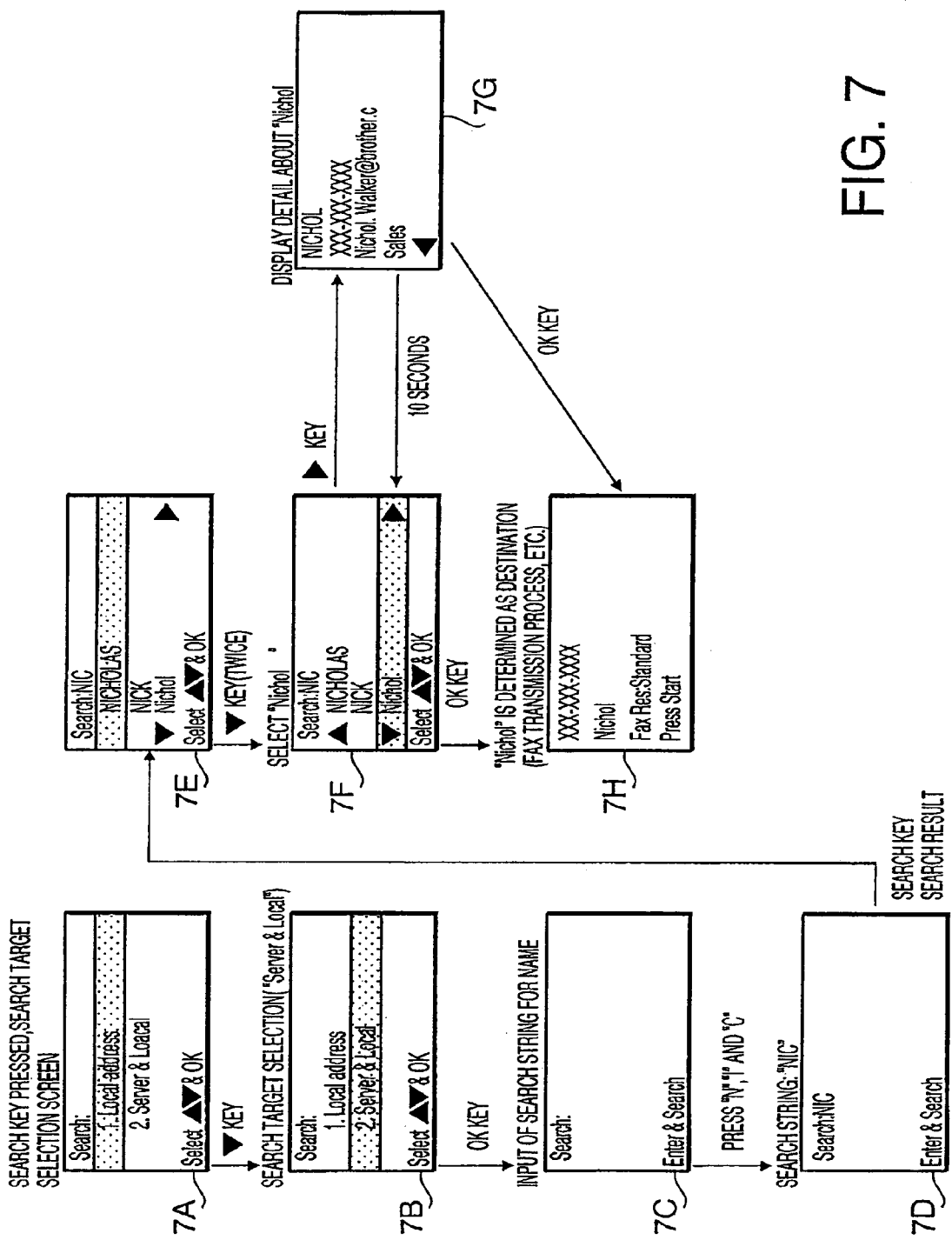
FIG. 7 is a schematic diagram showing screens displayed on the display unit of the MFP in a second example.

Next, another example of the operation of the MFP 10 will be described referring to FIGS. 7 and 8. FIG. 7 is a schematic diagram showing screens displayed on the display unit 19 of the MFP 10 in the second example. Screens 7A-7H shown in FIG. 7 are substantially identical with the screens 5A-5H in FIG. 5 (first example) except for the operation of the screen 7G FIG. 8 is a flow chart showing the operation of the MFP 10 in the second example, wherein steps other than step S9 are identical with those in FIG. 6 (first example) and thus repeated explanation thereof is omitted for brevity.

Figure 8:
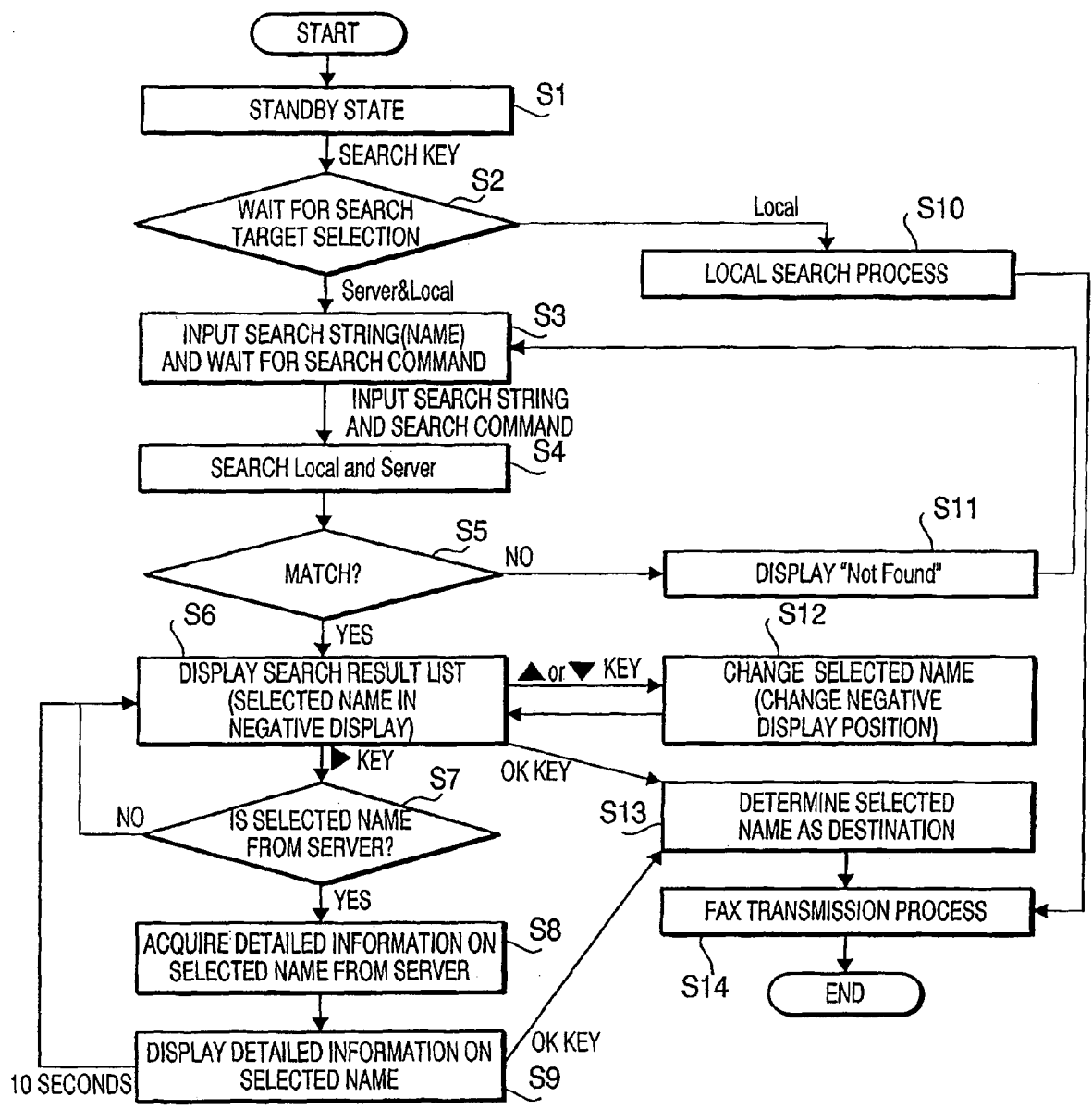
FIG. 8 is a flow chart showing the operation of the MFP 10 in the second example.

In the step S9 of FIG. 8, the display of the detailed information on the display unit 19 is stopped and the process automatically returns to the step S6 (the display returns from the detailed information screen 7G to the screen 7F shown in FIG. 7) when a prescribed time period (e.g. 10 seconds) has passed since the start of the display, by which the user is relieved of the need of pressing the leftward triangle key for returning to the screen 7F (the need of closing the detailed information screen 7G) after each check on the detailed information screen 7G. Since the user can hope to perform the operation for returning from the screen 7G to the screen 7F, the leftward triangle (the function for returning to the screen 7F) is left on the screen 7G. With the leftward triangle displayed on the screen 7G the user can quickly recognize that the display can be manually returned to the screen 7F by pressing the leftward triangle key of the input unit 18. The above operation is implemented by the CPU 11 by executing the detailed information display cancellation program 13i stored in the ROM 13.

Figure 9:
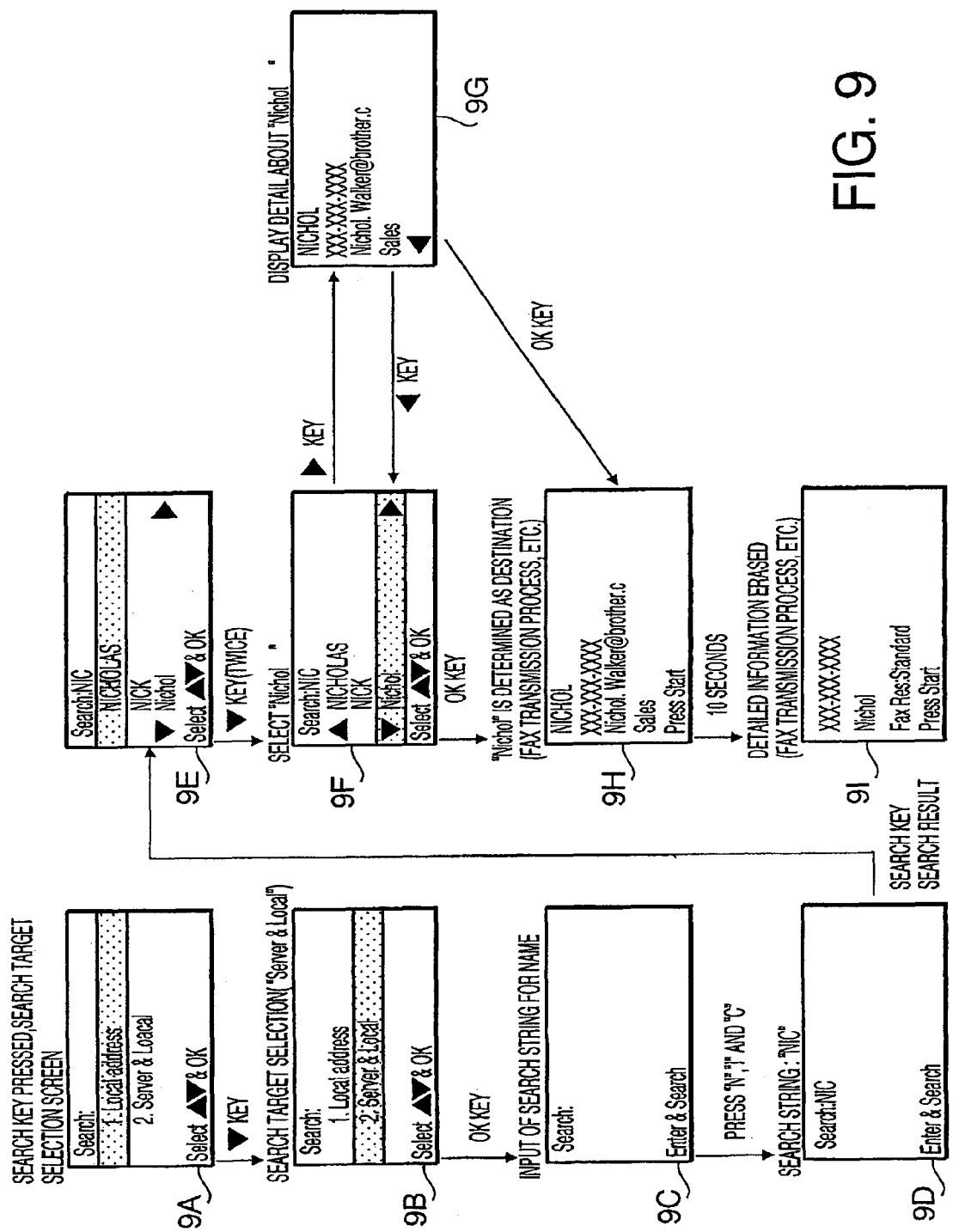
FIG. 9 is a schematic diagram showing screens displayed on the display unit of the MFP in a third example.
Figure 10:
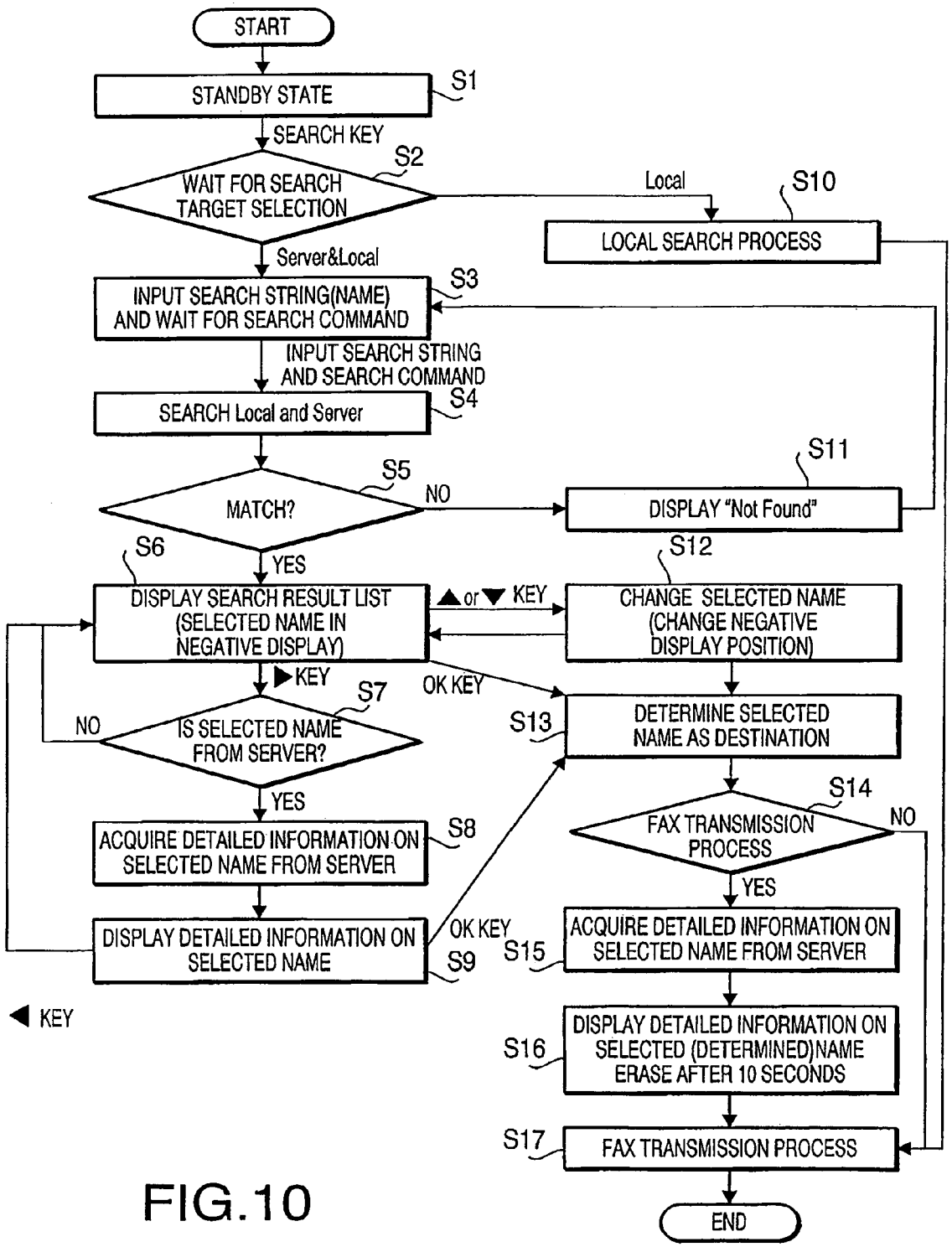
FIG. 10 is a flow chart showing the operation of the MFP 10 in the third example.

Next, still another example of the operation of the MFP 10 will be described referring to FIGS. 9 and 10. FIG. 9 is a schematic diagram showing screens displayed on the display unit 19 of the MFP 10 in the third example, wherein screens 9A-9G are identical with the screens 5A-5G in FIG. 5 (first example). FIG. 10 is a flow chart showing the operation of the MFP 10 in the third example, wherein steps identical with those in FIG. 6 (first example) are indicated with the same step numbers and repeated explanation thereof is omitted for brevity.

When the confirmation key (OK key) is pressed by the user in the step S6 (while the screen 9F shown in FIG. 9 is displayed on the display unit 19), the CPU 11 determines (the name of) the destination of data transmission (S13) similarly to the first example. Subsequently, the CPU 11 automatically makes the judgment on whether the name (entry information) selected on the screen 9F was acquired from the directory server 30 or not, that is, whether the selected entry information includes the detailed information or not (S14). If the selected name was acquired from the directory server 30 (S14: YES), the CPU 11 acquires the detailed information associated with the selected name from the directory server 30 (S15) and displays the acquired detailed information (detailed information screen 9H shown in FIG. 9) on the display unit 19 (S16). When a prescribed time period (e.g. 10 seconds) has passed since the start of the display of the detailed information screen 9H, the CPU 11 stops displaying the screen 9H and executes the FAX transmission process while displaying a screen 9I shown in FIG. 9 (S17). By the above process, the detailed information is necessarily displayed to the user when the detailed information is included in the selected entry information, by which the user is prevented from setting the destination erroneously. The above operation is implemented by the CPU 11 by executing the detailed information enforced display program 13j stored in the ROM 13.

In the third example, when the confirmation key (OK key) is pressed by the user in the step S9 (while the detailed information screen 9G is displayed on the display unit 19), the display returns not to the screen 9F but to the screen 9H as shown in FIG. 9 and thereafter the FAX transmission process is executed (S9, S13-S17). Incidentally, although not shown in FIGS. 9 and 10, the display may also be switched from the detailed information screen 9G directly to the screen 9I, that is, the process may directly advance to the step S17 when the confirmation key (OK key) is pressed by the user in the step S9 of FIG. 10.

As described above, in the data transmission device (MFP 10) and the data transmission system 1 in accordance with the embodiment of the present invention, each piece of entry information is displayed on the display unit 19 in a style discriminating between entry information including the detailed information and entry information not including the detailed information, by which the user hoping to view the detailed information is prevented from erroneously and unnecessarily performing the operation for requesting the detailed information (e.g. the pressing of the rightward triangle key) for entry information not including the detailed information.

Further, with the detailed information display cancellation program 13i, the display on the display unit 19 is automatically switched from the detailed information (detailed information screen 7G in FIG. 7) to the search result list (screen 7F in FIG. 7) when a prescribed time period has passed since the start of the display of the detailed information, by which the user is relieved of the need of closing the detailed information screen 7G after each check on the detailed information.

Furthermore, with the detailed information enforced display program 13j, the detailed information (detailed information screen 9G in FIG. 9) is necessarily displayed on the display unit 19 when the destination is determined (i.e. when the confirmation key (OK key) is pressed) by the user while the search result list (screen 9F in FIG. 9) is displayed, by which the probability of erroneous setting of the destination is reduced.

While a description has been given above of a preferred embodiment in accordance with the present invention, the present invention is not to be restricted by the particular illustrative embodiment and a variety of modifications, design changes, etc. are possible without departing from the scope and spirit of the present invention described in the appended claims.

What is claimed is:

1. A data transmission device comprising:
an input device including a plurality of selection keys;
a computer memory for storing first entry information and second entry information, the first entry information including a first destination name, first destination information and corresponding detailed information, the second entry information including a second destination name, second destination information and not including corresponding detailed information;
an entry information acquisition unit which acquires the first entry information and the second entry information from the computer memory;
a display device;
an entry information display unit which displays the first destination name of the first entry information and the second destination name of the second entry information at the same time on the display device in a discriminating style to discriminate from each other without displaying the corresponding detailed information;
an entry information selection unit configured to execute, depending on an input through the input device, a first selection and a second selection, both of which select the first destination name of the first entry information displayed in the discriminating style on the display device by the entry information display unit;
a detailed information display unit which, in response to the first selection, displays the detailed information corresponding to the selected first destination name on the display device;
a destination information acquisition unit which, in response to the second selection, acquires the first destination information corresponding to the selected first destination name; and
a data transmission unit which executes data transmission using the acquired first destination information,
wherein the entry information display unit displays the first destination name of the first entry information and the second destination name of the second entry information at the same time on the display device in the discriminating style by an indicator indicating one of the plurality of selection keys which is to be selected as the first selection for displaying the detailed information.

2. The data transmission device according to claim 1, wherein:
the first entry information including the corresponding detailed information is stored in a directory server while the second entry information not including any corresponding detailed information is stored in a local computer memory of the data transmission device, and
the entry information acquisition unit includes a directory server information acquisition unit which acquires, the first entry information from the directory server via a communication interface of the data transmission device and a local information acquisition unit which acquires the second entry information from the computer memory of the data transmission device, and
the entry information display unit displays the first entry information acquired by the directory server information acquisition unit on the display device in a style indicating that the first entry information includes the detailed information.

3. The data transmission device according to claim 1, wherein the entry information display unit displays the first destination name and the second destination name in the discriminating style by displaying an indicator corresponding to a characteristic of the input device necessary for an operation for requesting the display of the detailed information together with the first destination name.

4. The data transmission device according to claim 1, wherein the detailed information display unit displays an indicator corresponding to a characteristic of the input device necessary for an operation for stopping the display of the detailed information together with the detailed information.

5. A data transmission device comprising:
an input device including a plurality of selection keys;
a computer memory for storing first entry information and second entry information, the first entry information including a first destination name, first destination information and corresponding detailed information, the second entry information including second destination name, second destination information and not including corresponding detailed information;
an entry information acquisition unit which acquires the first entry information and the second entry information from the computer memory;
a display device;
an entry information display unit which displays the first destination name of the first entry information and the second destination name of the second entry information at the same time on the display device in a discriminating style to discriminate from each other without displaying the corresponding detailed information;
an entry information selection unit configured to execute, depending on the input through the input device, a first selection and a second selection, both of which select the first destination name of the first entry information displayed in the discriminating style on the display device by the entry information display unit;
a detailed information display unit which, in response to the first selection, displays the detailed information corresponding to the selected first destination name in the display device;
a detailed information display cancellation unit which stops the display of the detailed information in response to passing of a prescribed time period from starting of the display of the detailed information;
a destination information acquisition unit which, in response to the second selection, acquires the first destination information corresponding to the selected first destination name; and
a data transmission unit which executes data transmission using the acquired first destination information, wherein the entry information display unit displays the first destination name of the first entry information and the second destination name of the second entry information at the same time on the display device in the discriminating style by an indicator indicating one of the plurality of selection keys which is to be selected as the first selection for displaying the detailed information.

6. The data transmission device according to claim 5, wherein the entry information display unit displays destination names again in response to passing of the prescribed time period from starting of the display of the detailed information.

7. The data transmission device according to claim 5, further comprising a detailed information enforced display unit which displays the detailed information on the display device for a prescribed time period before the data transmission by the data transmission unit when an operation for requesting the data transmission is performed by a user and the first destination name is displayed on the display device.

8. The data transmission device according to claim 5, wherein the entry information display unit displays the first destination name on the display device with an indicator indicating that the first entry information includes the detailed information.

9. A non-transitory computer readable medium storing computer-readable instructions that, when executed by a computer, cause the computer to function as:
an entry information acquisition unit which acquires first entry information and second entry information from a storage device, the first entry information including a first destination name, first destination information and corresponding detailed information, the second entry information including a second destination name, second destination information and not including corresponding detailed information;
an entry information display unit which displays the first destination name of the first entry information and the second destination name of the second entry information at the same time on a display device in a discriminating style to discriminate from each other without displaying the corresponding detailed information;
an entry information selection unit configured to execute, depending on an input through an input device, a first selection and a second selection, both of which select the first destination name of the first entry information displayed in the discriminating style on the display device by the entry information display unit, wherein the input device includes a plurality of selection keys;
a detailed information display unit, in response to the first selection, displays the detailed information corresponding to the selected first destination name;
a destination information acquisition unit which, in response to the second selection, acquires the first destination information corresponding to the selected first destination name; and
a destination information supply unit which supplies the acquired first destination information to a data transmission unit which executes data transmission using the acquired first destination information,
wherein the entry information display unit displays the first destination name of the first entry information and the second destination name of the second entry information at the same time on the display device in the discriminating style by an indicator indicating one of the plurality of selection keys which is to be selected as the first selection for displaying the detailed information.

10. A non-transitory computer readable medium storing computer-readable instructions that, when executed by a computer, cause the computer to function as:
an entry information acquisition unit which acquires first entry information and second entry information from a storage device, the first entry information including a first destination name, first destination information and corresponding detailed information, the second entry information including second destination name, second destination information and not including corresponding detailed information;
an entry information display unit which displays the first destination name of the first entry information and the second destination name of the second entry information at the same time on a display device in a discriminating style to discriminate from each other without displaying the corresponding detailed information;
an entry information selection unit configured to execute, depending on an input through an input device, a first selection and a second selection, both of which select the first destination name of the first entry information displayed in the discriminating style on the display device by the entry information display unit, wherein the input device includes a plurality of selection keys;
a detailed information display unit which, in response to the first selection, displays the detailed information corresponding to the selected first destination name;
a detailed information display cancellation unit which stops the display of the detailed information in response to passing of a prescribed time period from starting of the display of the detailed information;
a destination information acquisition unit which, in response to the second selection, acquires the first destination information corresponding to the selected first destination name; and
a destination information supply unit which supplies the acquired first destination information to a data transmission unit which executes data transmission using the acquired first destination information,
wherein the entry information display unit displays the first destination name of the first entry information and the second destination name of the second entry information at the same time on the display device in the discriminating style by an indicator indicating one of the plurality of selection keys which is to be selected as the first selection for displaying the detailed information.

11. A data transmission method comprising:
an entry information acquisition step of acquiring first entry information and second entry information from a computer memory, the first entry information including a first destination name, first destination information and corresponding detailed information, the second entry information including a second destination name, second destination information and not including corresponding detailed information;
an entry information display step of displaying the first destination name of the first entry information and the second destination name of the second entry information at the same time on a display device in a discriminating style to discriminate from each other without displaying the corresponding detailed information;
an entry information selection step of executing, depending on an input through an input device, a first selection and a second selection, both of which select the first destination name of the first entry information displayed in the discriminating style on the display device by the entry information display unit, wherein the input device includes a plurality of selection keys;
a detailed information display step of displaying, in response to the first selection, the detailed information corresponding to the selected first destination name;
a destination information acquisition step of acquiring, in response to the second selection, the first destination information corresponding to the selected first destination name; and
a data transmission step of executing data transmission using the acquired first destination information,
wherein in the entry information display step, the first destination name of the first entry information and the second destination name of the second entry information are displayed at the same time on the display device in the discriminating style by an indicator indicating one of the plurality of selection keys which is to be selected as the first selection for displaying the detailed information.

12. A data transmission method comprising:
an entry information acquisition step of acquiring first entry information and second entry information from a computer memory, the first entry information including a first destination name, first destination information and corresponding detailed information, the second entry information including second destination name, second destination information and not including corresponding detailed information;
an entry information display step of displaying the first destination name of the first entry information and the second destination name of the second entry information at the same time on a display device in a discriminating style to discriminate from each other without displaying the corresponding detailed information;
an entry information selection step of executing, depending on an input through an input device, a first selection and a second selection, both of which select the first destination name of the first entry information displayed in the discriminating style on the display device by the entry information display unit, wherein the input device includes a plurality of selection keys;
a detailed information display step of displaying, in response to the first selection, the detailed information corresponding to the selected first destination name;
a detailed information display cancellation step of stopping the display of the detailed information in response to passing of a prescribed time period from starting of the display of the detailed information;
a destination information acquisition step of acquiring, in response to the second selection, the first destination information corresponding to the selected first destination name; and
a data transmission step of executing data transmission using the acquired first destination information,
wherein in the entry information display step, the first destination name of the first entry information and the second destination name of the second entry information are displayed at the same time on the display device in the discriminating style by an indicator indicating one of the plurality of selection keys which is to be selected as the first selection for displaying the detailed information.

13. A data transmission system comprising a data transmission device and a directory server, wherein the data transmission device includes:
an input device including a plurality of selection keys;
an entry information acquisition unit which acquires first entry information and second entry information from a computer memory, the first entry information including a first destination name, first destination information and corresponding detailed information, the second entry information including a second destination name, second destination information and not including corresponding detailed information;
an entry information display unit which displays the first destination name of the first entry information and the second destination name of the second entry information at the same time on a display device in a discriminating style to discriminate from each other without displaying the corresponding detailed information;
an entry information selection unit configured to execute, depending on the input through the input device, a first selection and a second selection, both of which select the first destination name of the first entry information displayed in the discriminating style on the display device by the entry information display unit;
a detailed information display unit which, in response to the first selection, displays the detailed information corresponding to the selected first destination name;

a destination information acquisition unit which, in response to the second selection, acquires the first destination information corresponding to the selected first destination name; and a data transmission unit which executes data transmission using the acquired first destination information, wherein the entry information display unit displays the first destination name of the first entry information and the second destination name of the second entry information at the same time on the display device in the discriminating style by an indicator indicating one of the plurality of selection keys which is to be selected as the first selection for displaying the detailed information.

14. A data transmission system comprising a data transmission device and a directory server, wherein the data transmission device includes:

an input device including a plurality of selection keys;

an entry information acquisition unit which acquires first entry information and second entry information from a computer memory, the first entry information including a first destination name, first destination information and corresponding detailed information, the second entry information including second destination name, second destination information and not including corresponding detailed information;

an entry information display unit which displays the first destination name of the first entry information and the second destination name of the second entry information at the same time on a display device in a discriminating style to discriminate from each other without displaying the corresponding detailed information;

an entry information selection unit configured to execute, depending on the input through the input device, a first selection and a second selection, both of which select the first destination name of the first entry information displayed in the discriminating style on the display device by the entry information display unit;

a detailed information display unit which, in response to the first selection, displays the detailed information corresponding to the selected first destination name;

a detailed information display cancellation unit which stops the display of the detailed information in response to passing of a prescribed time period from starting of the display of the detailed information;

a destination information acquisition unit which, in response to the second selection, acquires the first destination information corresponding to the selected first destination name; and a data transmission unit which executes data transmission using the acquired first destination information, wherein the entry information display unit displays the first destination name of the first entry information and the second destination name of the second entry information at the same time on the display device in the discriminating style by an indicator indicating one of the plurality of selection keys which is to be selected as the first selection for displaying the detailed information.

* * * * *